United States Patent
Lee

(10) Patent No.: US 11,797,444 B2
(45) Date of Patent: Oct. 24, 2023

(54) STORAGE DEVICE FOR STORING ADDRESS INFORMATION AND DATA IN MEMORY DEVICE IN RESPONSE TO OCCURRENCE OF POWER LOSS AND OPERATING METHOD OF THE STORAGE DEVICE

(71) Applicant: SK hynix Inc., Gyeonggi-do (KR)

(72) Inventor: Jae Il Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 134 days.

(21) Appl. No.: 17/338,334

(22) Filed: Jun. 3, 2021

(65) Prior Publication Data

US 2022/0171707 A1 Jun. 2, 2022

(30) Foreign Application Priority Data

Nov. 30, 2020 (KR) .................. 10-2020-0164529

(51) Int. Cl.
*G06F 12/0804* (2016.01)
*G06F 12/10* (2016.01)

(52) U.S. Cl.
CPC .......... *G06F 12/0804* (2013.01); *G06F 12/10* (2013.01); *G06F 2212/1032* (2013.01)

(58) Field of Classification Search
CPC ............... G06F 12/0804; G06F 12/10; G06F 2212/1032; G06F 1/30; G06F 2212/7203; G06F 12/0246; G06F 11/1458; G06F 3/064; G06F 3/0656; G06F 3/0658; G06F 11/1448; G06F 2212/7201; G11C 16/08; G11C 16/10

See application file for complete search history.

(56) References Cited

U.S. PATENT DOCUMENTS

| | | | | |
|---|---|---|---|---|
| 8,677,037 B1* | 3/2014 | Karamcheti | ........ | G06F 13/1642 710/62 |
| 9,830,257 B1* | 11/2017 | Booth | ................ | G11C 14/0018 |
| 2013/0007511 A1* | 1/2013 | Gaertner | ............ | G06F 11/1092 714/6.22 |
| 2014/0040697 A1* | 2/2014 | Loewenstein | ..... | H03M 13/2921 714/763 |
| 2014/0304454 A1* | 10/2014 | Ellis | .................... | G06F 11/1441 711/118 |
| 2015/0106557 A1* | 4/2015 | Yu | ...................... | G11C 13/0004 711/103 |
| 2018/0357165 A1* | 12/2018 | Helmick | ............. | G06F 12/0653 |
| 2020/0371571 A1* | 11/2020 | Kojima | ................... | G06F 1/263 |
| 2021/0397509 A1* | 12/2021 | Lin | ..................... | G06F 11/0772 |

FOREIGN PATENT DOCUMENTS

| KR | 10-2019-0060429 A | 6/2019 |
| KR | 10-2020-0021861 A | 3/2020 |

* cited by examiner

*Primary Examiner* — Michael Krofcheck
(74) *Attorney, Agent, or Firm* — IP & T GROUP LLP

(57) ABSTRACT

There are provided a storage device and an operating method thereof. The storage device includes: a memory device including a plurality of memory blocks, a buffer memory configured to temporarily store data, and a memory controller configured to, in response to occurrence of a power loss, generate address information including logical addresses of write data that correspond to the data temporarily stored in the buffer memory and meta data, and control the memory device to store the address information and the write data in a predetermined backup block group included in the plurality of memory blocks.

20 Claims, 12 Drawing Sheets

| LOGICAL ADDRESS | PHYSICAL ADDRESS | WRITE DATA |
|---|---|---|
| LBA 1 | PBA 1 | WDATA 1 |
| LBA 2 | PBA 2 | WDATA 2 |
| LBA 3 | PBA 3 | WDATA 3 |
| LBA 4 | PBA 4 | WDATA 4 |
| ⋮ | ⋮ | ⋮ |

STORAGE DEVICE FOR STORING ADDRESS INFORMATION AND DATA IN MEMORY DEVICE IN RESPONSE TO OCCURRENCE OF POWER LOSS AND OPERATING METHOD OF THE STORAGE DEVICE

CROSS-REFERENCE TO RELATED APPLICATION

The present application claims priority under 35 U.S.C. § 119(a) to Korean patent application number 10-2020-0164529, filed on Nov. 30, 2020, which is incorporated by reference herein in its entirety.

BACKGROUND

Field of Invention

One or more embodiments described herein relate to a storage device and a method of operating a storage device.

Description of Related Art

A storage device may include a memory controller that stores data in a memory device based on instructions from a host. The memory device may be a volatile memory device or a nonvolatile memory device.

A volatile memory device store data while power is supplied from a power supply, but the data is lost when the power is interrupted. Examples of a volatile memory device include a Static Random Access Memory (SRAM) and a Dynamic Random Access Memory (DRAM).

A nonvolatile memory device stores data even when power is interrupted. Examples of a nonvolatile memory device include a Read Only Memory (ROM), a Programmable ROM (PROM), an Electrically Programmable ROM (EPROM), an Electrically Erasable ROM (EEROM), and a flash memory.

SUMMARY

One or more embodiments provide a storage device which may achieve improved reliability, for example, by checking for lost data in a power loss protection operation and then by subsequently recovering the lost data. A method of operating such a storage device is also provided.

In accordance with an aspect of the present disclosure, there is provided a storage device including: a memory device including a plurality of memory blocks, a buffer memory configured to temporarily store data, and a memory controller configured to, in response to occurrence of a power loss, generate address information including logical addresses of write data that correspond to the data temporarily stored in the buffer memory and meta data, and control the memory device to store the address information and the write data in a predetermined backup block group included in the plurality of memory blocks.

In accordance with another aspect of the present disclosure, there is provided a storage device including: a memory device including a plurality of memory blocks; a buffer memory configured to temporarily store data provided from the memory device, and a memory controller configured to, when power is supplied, acquire write data and address information, which are stored in a predetermined backup block group, according to whether a previous power cycle has normally ended, and provide a host with a logical address of loss write data of which recovery fails among the write data, according to the address information, wherein the predetermined backup block group corresponds to one or more of the plurality of memory blocks included in the memory device.

In accordance with still another aspect of the present disclosure, there is provided a method for operating a storage device, the method including: temporarily storing data and logical addresses in a buffer memory, generating, in response to occurrence of a power loss, a logical address table including information corresponding to the logical addresses temporarily stored in the buffer memory, and storing write data including the data and meta data and the logical address table in a backup block group included in a memory device.

In accordance with another aspect of the present disclosure, there is provided a storage device including: a memory device including a plurality of memory blocks; a buffer memory configured to temporarily store data provided from a host, and a memory controller configured to: in response to occurrence of a power loss, generate address information and meta data, and control the memory device to store the address information and write data in a backup block group included in the plurality of memory blocks, the address information including logical addresses of the write data that correspond to the data temporarily stored in the buffer memory, and acquire, when a power loss occurs in a previous power cycle and power is supplied, the write data and the address information from the backup block group, and provide the host with a logical address of loss write data of which recovery fails among the write data, according to the address information.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
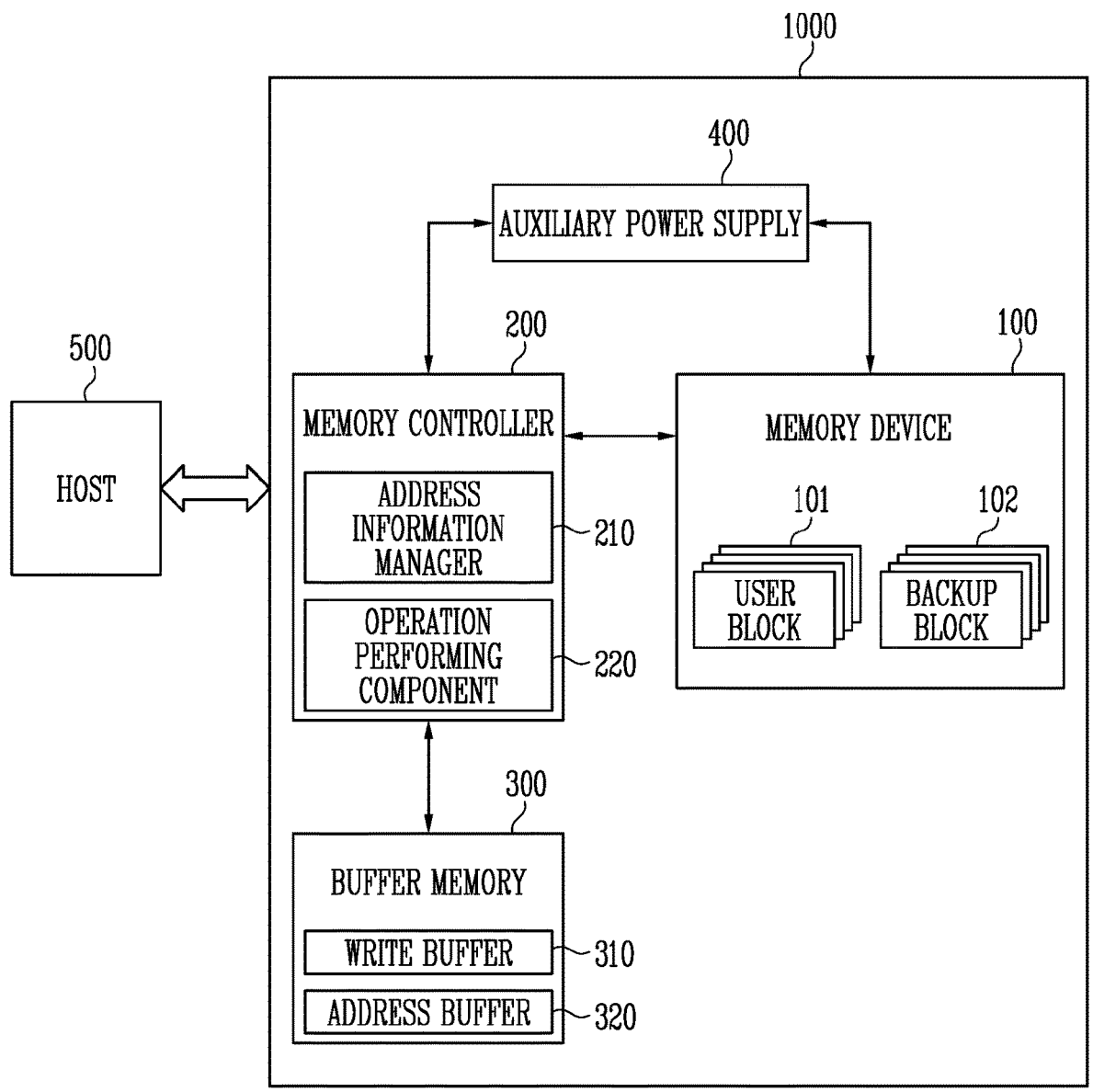
FIG. 1 illustrates an embodiment of a storage system.

FIG. 1 is a diagram illustrating an embodiment of a storage system, which, for example, may correspond to, be included in, or coupled to a data processing system. Examples of the data processing system include a personal computer, data center, enterprise-type data storage system, a system including direct attached storage, a data processing system including a storage area network, a data processing system including a network attached storage, or another type of system.

The storage system may include a storage device 1000 and a host 500. The storage device 1000 may store data according to a request of the host 500. Examples of the host include a mobile phone, a smart phone, an MP3 player, a laptop computer, a desktop computer, a game console, a TV, a tablet PC, and an in-vehicle infotainment system.

The storage device 1000 may be any one of various types of storage devices, for example, based on a host interface implementing a communication scheme with the host 500. Examples of the storage device include a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), and a memory stick.

The storage device 1000 may be any one of various kinds of package types. Examples include a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

In an embodiment, one storage device 1000 may be provided as shown in FIG. 1. In one embodiment, two or more storage devices 1000 may be provided. In one embodiment, a plurality of storage devices 1000 may operate using a redundant array of independent disks (RAID) scheme or a redundant array of inexpensive disks (RAID) scheme, in which the plurality of storage devices 1000 operate as one storage device.

The storage device 1000 may include a memory device 100, a memory controller 200, a buffer memory 300, and an auxiliary power supply 400. The memory device 100 may operate under control of the memory controller 200. For example, the memory device 100 may receive commands and addresses from the memory controller 200, and may access memory cells selected by the addresses. The memory device 100 may perform operations indicated by the commands on the memory cells selected by the addresses.

Examples of the commands include program commands, read commands, and/or erase commands, which respectively correspond to program operations (or write operations), read operations, and/or erase operations. In a program operation, the memory device 100 may store write data provided from the host 500 under control of the memory controller 200. For example, the memory device 100 may receive a program command, an address and data and then program the data in a memory cell selected by the address. The data to be programmed in the selected memory cell may be referred to as write data. The write data may include, for example, data (or user data) provided from the host 500 and/or meta data of the data.

In a read operation, the memory device 100 reads data stored in the memory device 100 under the control of the memory controller 200. For example, the memory device 100 may receive a read command and an address, and read data from an area selected by the address in a memory cell array. The data to be read from the selected area among data stored in the memory device 100 may be referred to as read data.

In an erase operation, the memory device 100 erases data stored in the memory device 100 under the control of the memory controller 200. For example, the memory device 100 may receive an erase command and an address, and erase data stored in an area selected by the address.

The memory device 100 may be implemented as a volatile memory device or a nonvolatile memory device. Examples of a volatile memory device include a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR) SDRAM, and a Rambus Dynamic Random Access Memory (RDRAM). Examples of a nonvolatile memory device include a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), and a flash memory. The flash memory may include, for example, a NAND flash memory, a vertical NAND flash memory, a NOR flash memory, and or another type of flash memory. For convenience of description, it is assumed that the memory device 100 is a NAND flash memory.

The memory device 100 may store write data under the control of the memory controller 200 and/or may read stored read data and provide the read data to the memory controller 200.

The memory device 100 may include a plurality of dies. One die may include at least one plane. One plane may include a memory cell array including memory cells for storing write data. The memory cell array may include a plurality of memory blocks. A memory block may be a unit for performing an erase operation of erasing data. The plurality of memory blocks may be divided into a user block 101 and a backup block 102. For example, some memory blocks among the plurality of memory blocks may be user blocks 101 and other memory blocks among the plurality of memory blocks may be backup blocks 102. User block 101 may store data (e.g., user data) provided from the host 500. In one embodiment, a plurality of user blocks 101 may be grouped into user block groups.

The backup block 102 may store meta data including, for example, map data, validity data, uncorrectable data, and/or another type of data. The backup block 102 may be a system block. In one embodiment, a plurality of backup blocks 102 may be grouped into backup block groups.

The meta data may be data representing information on data stored in a plurality of memory blocks. For example, map data may represent a mapping relationship between logical and physical addresses. Validity data may represent validity of data (or user data) provided from the host 500. Uncorrectable data may represent that data (or user data) from the host 500 has an uncorrectable error. Valid page data may represent a number of valid pages in a memory block. Erase number data may represent a number of times an erase operation is performed on a memory block. Additional types of meta data may also be included.

The memory block may include a plurality of pages. A page may be a unit for performing a program operation of storing write data or a read operation of reading stored read data.

The memory cell may be configured, for example, as a Single Level Cell (SLC) storing 1-bit data, a Multi-Level Cell (MLC) storing 2-bit data, a Triple Level Cell (TLC) storing 3-bit data, a Quadruple Level Cell (QLC) storing 4-bit data, or a memory cell that stores 5 or more-bit data.

The memory controller 200 may control overall operations of the storage device 1000. When power is applied to the storage device 1000, the memory controller 200 may execute instructions (e.g., firmware or another type of instructions). When the memory device 100 is a flash memory device, the firmware may include a host interface layer, a flash translation layer, and a flash interface layer. The host interface layer may control one or more operations between the host 500 and the memory controller 200. The flash translation layer may translate a logical address provided from the host 500 to a physical address. The flash interface layer may control communication between the memory controller 200 and memory device 100. The power may be, for example, power supplied from an external source, e.g., the host or another source.

The memory controller 200 may control the memory device 100 to perform a program operation, a read operation, and an erase operation in response to respective ones of a write request, a read request, and an erase request of the host 500.

In a program operation, memory controller 200 may provide the memory device 100 with a program command, a physical address, and write data. In accordance with one embodiment of a program operation, the memory controller 200 may provide the memory device 100 with a program command and a physical address. Additionally, or alternatively, the memory controller 200 may provide a flush command to the buffer memory 300, to provide (or flush) data temporarily stored in the buffer memory 300 to the memory device 100. When the data temporarily stored in the buffer memory 300 is provided to the memory device 100, the data temporarily stored in the buffer memory 300 may be erased.

In a read operation, the memory controller 200 may provide the memory device 100 with a read command and a physical address.

In the erase operation, the memory controller 200 may provide the memory device 100 with an erase command and a physical address.

In one embodiment, the memory controller 200 may autonomously generate a command, an address, and data regardless of a request from the host 500. The memory controller 200 may transmit the command, the address, and the data (which are autonomously generated, e.g., generated without a host request) to the memory device 100. Examples of the command include ones for performing a background operation, an address, and data. The memory controller 200 may provide the memory device 100 with the command and an associated address and data.

A background operation may be, for example, at least one of a wear leveling operation, a read reclaim operation, or garbage collection operation. Wear leveling may correspond, for example, to static wear leveling, dynamic wear leveling, or another type of wear leveling. A static wear leveling may involve storing information indicative of the number of times memory blocks are erased, and moving cold data (on which an erase operation or a write operation is seldom performed, e.g., below a predetermined number of times) to a memory block which is erased a largest number of times (or greater than another predetermined number of times). A dynamic wear leveling may involve storing information indicative of the number of times memory blocks are erased, and programing data in a memory block which is erased a smallest number of times (or less than a predetermined number of times).

A read reclaim operation may involve moving data stored in a memory block to another memory block before an uncorrectable error occurs in the data stored in the memory block.

A garbage collection operation may involve copying valid data in a bad block to a free block and erasing invalid data in the bad block. Copying the valid data in the bad block to the free block may include, for example, moving the valid data in the bad block to the free block.

The memory controller 200 may control two or more memory devices 100, for example, using an interleaving technique in order to improve operational performance. The interleaving technique may include controlling operations on the two or more memory devices 100 to overlap with each other.

The buffer memory 300 may store data only while the buffer memory 300 is receiving power from a power source. The buffer memory 300 may be, for example, a volatile memory device. Examples of the buffer memory 300 include a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR) SDRAM, a Rambus Dynamic Random Access Memory (RDRAM), or another type of memory device.

In an embodiment, the buffer memory 300 may temporarily store data provided from the host 500. In one embodiment, the buffer memory 300 may temporarily store data provided from the memory device 100. In an embodiment, the buffer memory 300 may temporarily store logical addresses provided from the host 500.

In one embodiment, the buffer memory 300 may include a write buffer 310 and an address buffer 320. The write buffer 310 may temporarily store data provided from the host 500. The address buffer 320 may temporarily store logical addresses provided from the host 500. In one embodiment, the buffer memory 300 may further include a map data buffer for storing a logical-to-physical table (or L2P table), including a portion of or all map data stored in the backup block 102.

The auxiliary power supply 400 may generate auxiliary power in response to occurrence of power loss. Power loss may include, for example, the situation where the supply of power to the storage device 1000 is suspended or otherwise interrupted. The auxiliary power may be provided to the memory device 100 and the memory controller 200. Also, the auxiliary power may be provided to the buffer memory 300.

Power loss may occur, for example, while the memory controller 200 controls a general operation of the storage device 1000. When a power loss occurs, data temporarily stored in the buffer memory 300 may be lost when the data is not stored in the memory device 100. In order to prevent data provided from the host 500 from being lost in case of a power loss, memory controller 200 may perform a power loss protection operation using the auxiliary power.

In one embodiment, the power loss protection operation may include an operation of storing data, temporarily stored in buffer memory 300, in at least one backup block 102 in response to or before the power loss occurs.

In an embodiment, the memory controller 200 may generate address information including logical addresses of write data in response to occurrence of power loss. The memory controller 200 may control the memory device 100 to store the address information and the write data in a predetermined backup block group. The write data may include, for example, data temporarily stored in the buffer memory 300 and meta data. The backup block group may include backup blocks 102. Embodiments will be described with reference to FIG. 6.

After the power loss protection operation is performed, power generated from an external source may be supplied to the storage device 1000. The memory controller 200 may perform a recovery operation. The recovery operation may involve storing the write data (stored in the backup block group in the power loss protection operation) in a selected user block among the plurality of user blocks 101. The selected user block may be, for example, a user block having a physical address mapped to a logical address provided from the host 500.

In an embodiment, when power is input to the storage device 1000, the memory controller 200 may acquire write data and address information, which are stored in a predetermined backup block group, according to whether or not a previous power cycle has been normally ended. Also, the memory controller 200 may provide the host 500 with a logical address of loss write data, of which recovery fails among the write data according to the address information. Embodiments will be described with reference to FIGS. 7 and 8.

The memory controller 200 may include an address information manager 210 and an operation performing component (e.g., an operation controller) 220. In an embodiment, in the power loss protection operation, the address information manager 210 may generate address information. The address information manager 210 may control the memory device 100 to store the generated address information in the backup block 102.

In an embodiment of the recovery operation, the address information manager 210 may control the memory device 100 to read the address information stored in the backup block 102. The address information manager 210 may provide the operation performing component 220 with the address information from memory device 100. Embodiments of the address information manager 210 will be described with reference to FIGS. 5 to 8.

In an embodiment of the power loss protection operation, the operation performing component 220 may control the memory device 100 to store write data in the backup block 102.

In an embodiment of the recovery operation, the operation performing component 220 may control the memory device 100 to read the write data stored in the backup block 102. The operation performing component 220 may receive address information from the address information manager 210. The operation performing component 220 may check loss write data, of which recovery fails, based on the address information and the write data. The operation performing component 220 may detect a logical address of the checked loss write data and may provide the logical address of the loss write data to the host 500. The operation performing component 220 may control the memory device 100 to provide recovered write data and meta data of the loss write data to a selected user block among the plurality of user blocks 101. Embodiments of the operation performing component 220 will be described with reference to FIGS. 5 to 8.

The host 500 may communicate with the storage device 1000 through an interface. Examples of the interface include a serial advanced technology attachment (SATA) interface, a SATA express (SATAe) interface, a serial attached small computer system interface (SAS), a peripheral component interconnect express (PCIe) interface, a non-volatile memory express (NVMe) interface, an advanced host controller interface (AHCI), and a multimedia card interface. A different type of interface may be used in another embodiment.

The host 500 may store data in the storage device 1000, or may communicate with the storage device 1000 to acquire data stored in the storage device 1000. In an embodiment, the host 500 may provide the storage device 1000 with a write request for requesting the storage device 1000 to store data. The host 500 may provide the storage device 1000 with a write request, data, and a logical address to identify the data.

The storage device 1000 may store write data including the data provided by the host 500 and meta data in the memory device 100, and provide the host 500 with a response representing that the storing of the write data has been completed. These operations may be performed in response to the write request provided from the host 500.

In an embodiment, the host 500 may provide the storage device 1000 with a read request for requesting the storage device 1000 to provide data stored in the storage device 1000 to the host 500. The host 500 may provide the read request and a read address to the storage device 1000. In response to the read request, the storage device 1000 may read, from the memory device 100, data corresponding to the read address provided by the host 500 and may provide host 500 with the read data as a response to the read request.

Figure 2:
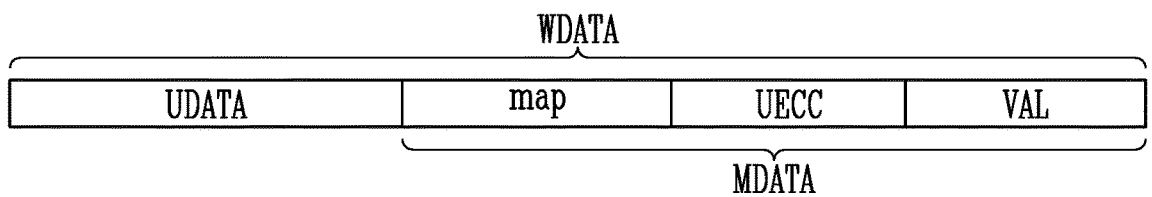
FIG. 2 illustrates an embodiment of write data.

FIG. 2 is a diagram illustrating an example of write data WDATA, which may include user data UDATA and meta data MDATA. The user data UDATA may be data provided from the host 500. In an embodiment, the meta data MDATA may include map data map, uncorrectable data UECC, and validity data VAL. In one embodiment, the meta data MDATA may further include valid page data, erase number data, and/or other data.

In an embodiment, the map data MDATA may represent a logical address of the user data UDATA and a physical address mapped to the logical address of the user data UDATA. In an embodiment, the uncorrectable data UECC may be data in which an error sign representing that an uncorrectable error has occurred in write data is marked. The validity data VAL may be data representing whether the user data UDATA is valid or invalid. In one embodiment, the meta data MDATA may include information representing that a power loss protection operation has been performed in a previous power cycle.

Figures 3, 4:
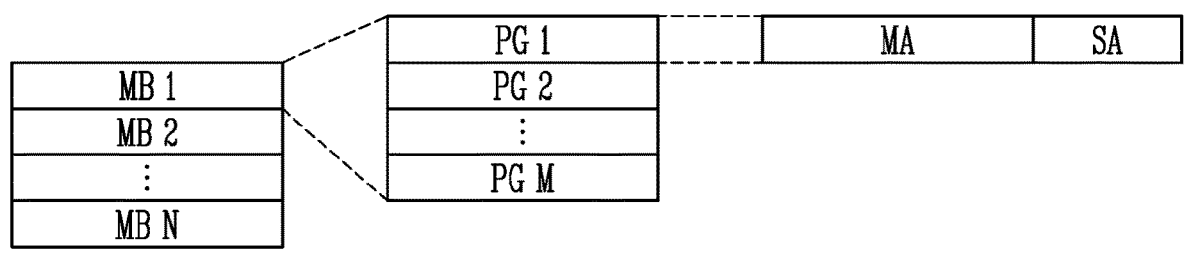
FIG. 3 illustrates an embodiment of a memory block and a page.
FIG. 4 illustrates an example of a relationship between mapped addresses and write data.

FIG. 3 is a diagram illustrating an embodiment of memory blocks MB 1, MB 2, . . . , and MB N and a page. In this embodiment, the memory blocks MB 1, MB 2, . . . , and MB N may be user blocks 101 or backup blocks as described, for example, with reference to FIG. 1.

In an embodiment, when the memory blocks MB 1, MB 2, . . . , and MB N are backup blocks 102, the memory blocks MB 1, MB 2, . . . , and MB N may be memory blocks including only SLCs. The number of memory blocks MB 1, MB 2, . . . , and MB N may be N (N is a natural number) and may vary among embodiments. Each of the memory blocks MB 1, MB 2, . . . , and MB N may include a plurality of pages PG 1, PG2, . . . , and PG M. The number of pages PG 1, PG2, . . . , and PG M may be M (M is a natural number) as shown in FIG. 3, and may vary among embodiments.

Each of the plurality of pages PG 1, PG2, . . . , and PG M may include a main area MA and a space area SA. In an embodiment, the main area MA may be an area in which the user data UDATA described above with reference to FIG. 2 is stored. The space area SA may be an area in which the meta data MDATA described above with reference to FIG. 2 is stored.

FIG. 4 is a diagram illustrating an example of a corresponding relationship between mapped addresses and write data. Referring to FIGS. 1 and 4, logical addresses LBA 1, LBA 2, LBA 3, and LBA 4 provided from the host 500 may be mapped to physical addresses PBA 1, PBA 2, PBA 3, and PBA 4 of a memory block included in the memory device 100. In an embodiment, the memory block having the physical addresses PBA 1, PBA 2, PBA 3, and PBA 4 shown in FIG. 4 may be a user block 101. In an embodiment, the memory block having the physical addresses PBA 1, PBA 2, PBA 3, and PBA 4 shown in FIG. 4 may be a backup block 102.

The logical addresses LBA 1, LBA 2, LBA 3, and LBA 4 may be mapped to the physical addresses PBA 1, PBA 2, PBA 3, and PBA 4 of the memory block. First write data WDATA 1, second write data WDATA 2, third write data WDATA 3, and fourth write data WDATA4, which are identified by the logical addresses LBA 1, LBA 2, LBA 3, and LBA 4, may be stored in physical addresses PBA 1, PBA 2, PBA 3, and PBA 4 mapped to the logical addresses LBA 1, LBA 2, LBA 3, and LBA 4, respectively. For example, the first write data WDATA 1 may be stored in a first physical address PBA 1 mapped to a first logical address LBA 1. The second write data WDATA 2 may be stored in a second physical address PBA 2 mapped to a second logical address LBA 2. The third write data WDATA 3 may be stored in a third physical address PBA 3 mapped to a third logical address LBA 3. The fourth write data WDATA 4 may be stored in a fourth physical address PBA 4 mapped to a fourth logical address LBA 4.

In an embodiment, when the memory block having the physical addresses PBA 1, PBA 2, PBA 3, and PBA 4 is the user block 101, the memory controller 200 may control the memory device 100 to store the first to fourth write data WDATA 1, WDATA 2, WDATA 3, and WDATA 4 in a user block having the physical addresses PBA 1, PBA 2, PBA 3, and PBA 4 corresponding to the logical addresses LBA 1, LBA 2, LBA 3, and LBA 4 among the plurality of user blocks 101.

In an embodiment, when the memory block having the physical addresses PBA 1, PBA 2, PBA 3, and PBA 4 is the backup block 102, the memory controller 200 may control the memory device 100 to store the first to fourth write data WDATA 1, WDATA 2, WDATA 3, and WDATA 4 in a backup block having the physical addresses PBA 1, PBA 2, PBA 3, and PBA 4, which correspond to the logical addresses LBA 1, LBA 2, LBA 3, and LBA 4 among the plurality of backup blocks 102.

In FIG. 4, the numbers of the logical addresses LBA 1, LBA 2, LBA 3, and LBA 4, the physical addresses PBA 1, PBA 2, PBA 3, and PBA 4, and the write data are provided merely for example purposes and may have different numbers in other embodiments. For convenience of description, embodiments will be described based on the logical addresses LBA 1, LBA 2, LBA 3, and LBA 4 and the first to fourth write data WDATA 1, WDATA 2, WDATA 3, and WDATA 4.

Figure 5:
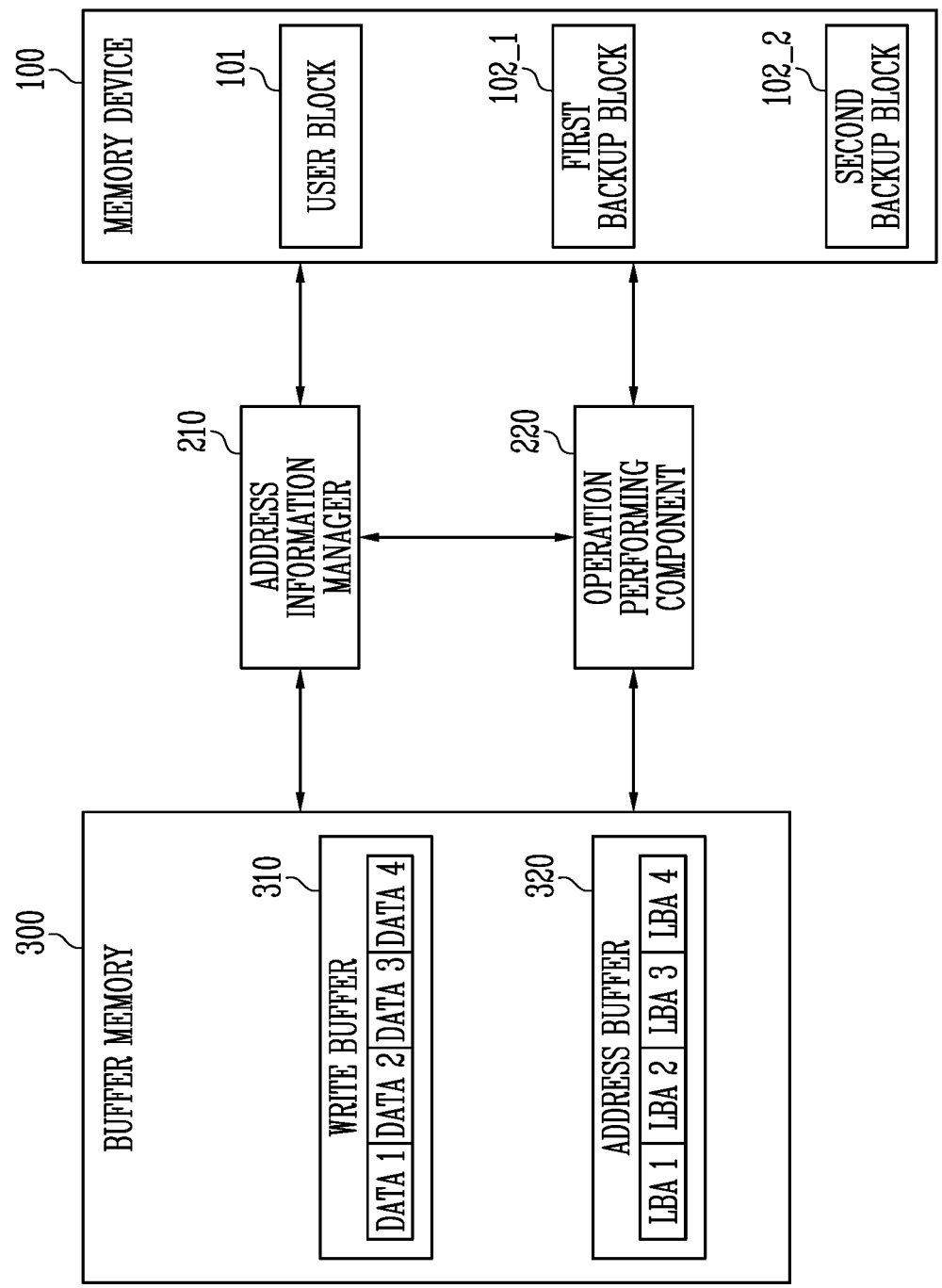
FIG. 5 illustrates an embodiment which includes an address information manager and an operation performing component.

FIG. 5 is a diagram illustrating an embodiment of an address information manager and an operation performing component. In this embodiment, it is assumed that user block 101 is a selected user block having physical addresses mapped to logical addresses LAB 1, LAB 2, LAB 3, and LAB 4 provided from the host 500, and a backup block group includes a first backup block 102_1 and a second backup block 102_2.

Referring to FIGS. 1 and 5, the host 500 may provide the storage device 1000 with first to fourth data DATA 1, DATA 2, DATA 3 and DATA 4, logical addresses LAB 1, LAB 2, LAB 3 and LAB 4, and a write request.

The memory controller 200 may temporarily store, in the buffer memory 300, the first to fourth data DATA 1, DATA 2, DATA 3 and DATA 4 and logical addresses LAB 1, LAB 2, LAB 3 and LAB 4. For example, the first to fourth data DATA 1, DATA 2, DATA 3, and DATA 4 may be temporarily stored in the write buffer 310. The logical addresses LAB 1, LAB 2, LAB 3, and LAB 4 may be temporarily stored in address buffer 320.

In an embodiment, the address information manager 210 may sense whether a power loss has occurred. When a power loss has not occurred, the address information manager 210 does not generate address information but may stand by.

In an embodiment, the address information manager 210 may be implemented as a power management core for managing power of the memory controller 200. However, the present disclosure is not limited thereto. When a power loss has not occurred, the operation performing component 220 may control the memory device 100 to store, in the user block 101, the first to fourth data DATA 1, DATA 2, DATA 3, and DATA 4 temporarily stored in the write buffer 310, and meta data of the first to fourth data DATA 1, DATA 2, DATA 3, and DATA 4.

In an embodiment, the operation performing component 220 may include a flash translation layer, for example, as described with reference to FIG. 1. Also, the operation performing component 220 may include host interface layer, for example, as described with reference to FIG. 1.

Figure 6:
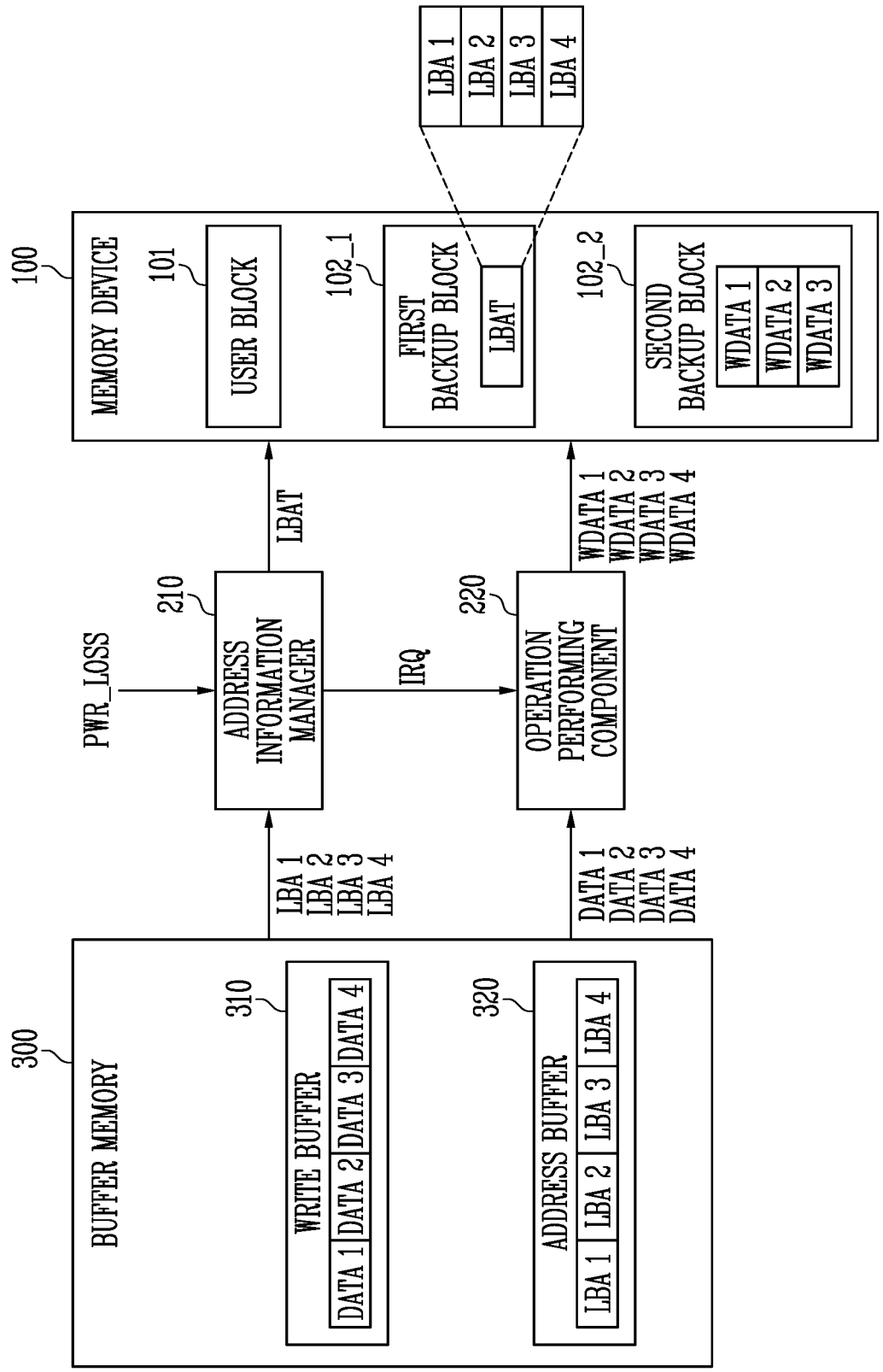
FIG. 6 illustrates an embodiment of a power loss protection operation.

FIG. 6 is a diagram illustrating an embodiment of a power loss protection operation. In this embodiment, it is assumed that a user block 101 is a selected user block having physical addresses mapped to logical addresses LAB 1, LAB 2, LAB 3, and LAB 4 provided from the host 500, and that a backup block group includes a first backup block 102_1 and a second backup block 102_2.

Referring to FIG. 6, the address information manager 210 may sense whether a power loss PWR_LOSS has occurred. When a power loss PWR_LOSS occurs, the address information manager 210 may provide the operation performing component 220 with a notification signal IRQ providing notification of the occurrence of the power loss PWR_LOSS. The address information manager 210 may acquire the logical addresses LAB 1, LAB 2, LAB 3, and LAB 4 temporarily stored in the address buffer 320, and may generate address information LBAT including the logical addresses LAB 1, LAB 2, LAB 3, and LAB 4. The address information manager 210 may control the memory device 100 to store the address information LBAT in the first backup block 102_1.

In an embodiment, the address information LBAT may be information configured as a table including the logical addresses LAB 1, LAB 2, LAB 3, and LAB 4 provided from the host 500. When the number of logical addresses LAB 1, LAB 2, LAB 3, and LAB 4 is 4 and the size of one logical address is 4 bytes, the size of the address information LBAT having a table structure may be 16 bytes. In an embodiment, the notification signal IRQ may request an interrupt of the operation performing component 220.

The operation performing component 220 may receive the notification signal IRQ and may acquire first to fourth data DATA 1, DATA 2, DATA 3, and DATA 4 temporarily stored in the write buffer 310. The operation performing component 220 may generate meta data of the first to fourth data DATA 1, DATA 2, DATA 3 and DATA 4, and may control the memory device 100 to store, in second backup block 102_2, first to fourth write data WDATA 1, WDATA 2, WDATA 3 and WDATA 4 including the first to fourth data DATA 1, DATA 2, DATA 3 and DATA 4 and meta data thereof.

When the power loss protection operation is normally performed, the first to fourth write data WDATA 1, WDATA 2, WDATA 3, and WDATA 4 may be stored in the second backup block 102_2. In addition, meta data including information indicating that the power loss protection operation has been performed may be stored in the second backup block 102_2.

In the process of storing the first to fourth write data WDATA 1, WDATA 2, WDATA 3 and WDATA 4 in the second backup block 102_2, it is possible for some write data among the first to fourth write data WDATA 1, WDATA 2, WDATA 3 and WDATA 4 to be lost. For example, the fourth write data WDATA 4 among the first to fourth write data WDATA 1, WDATA 2, WDATA 3 and WDATA 4 may be lost. In this case, the fourth write data WDATA 4 may be referred to as loss write data. When the fourth write data WDATA 4 is lost, the first to third write data WDATA 1, WDATA 2 and WDATA 3 may be stored in the second backup block 102_2.

A check may be performed to determine which write data among the first to fourth write data WDATA 1, WDATA 2, WDATA 3 and WDATA 4 has been lost. To this end, when power is supplied after a power loss PWR_LOSS occurs, information representing the logical addresses LAB 1, LAB 2, LAB 3 and LAB 4 stored in the address buffer 320 before the power loss PWR_LOSS occurred may be stored in the memory device 100.

When power is supplied after the power loss PWR_LOSS has occurred, operation performing component 220 may check loss write data (among the first to fourth write data WDATA 1, WDATA 2, WDATA 3 and WDATA 4) based on the address information LBAT stored in first backup block 102_1, and may detect a logical address of the loss write data.

Figure 7:
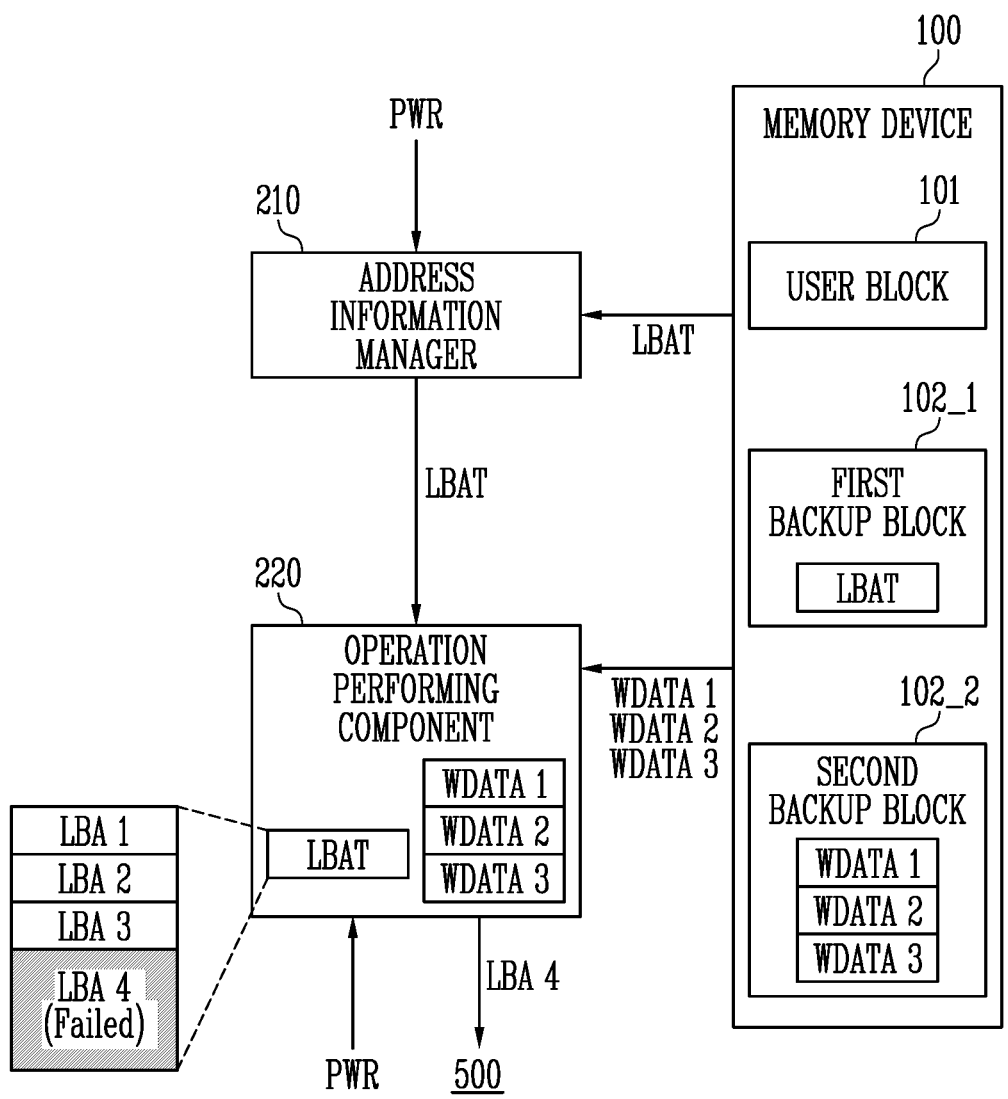
FIG. 7 illustrates an embodiment of detecting a logical address of loss write data.

FIG. 7 is a diagram illustrating an embodiment of detecting a logical address of loss write data. In this embodiment, it is assumed that a user block 101 is a selected user block having physical addresses mapped to logical addresses LAB 1, LAB 2, LAB 3, and LAB 4 provided from the host 500, that a backup block group includes a first backup block 102_1 and a second backup block 102_2, that fourth write data WDATA 4 is loss write data, and that a fourth logical address LBA 4 is a logical address of the loss write data.

Referring to FIGS. 6 and 7, power PWR may be supplied after the power loss PWR_LOSS occurs. In an embodiment, when the power PWR is input, the address information manager 210 may determine whether a previous power cycle has normally ended and may provide the determined result to operation performing component 220. In one embodiment, the operation performing component 220 may determine whether a previous power cycle has been normally ended, and may provide the determined result to the address information manager 210.

In an embodiment, when the power PWR is input, each of the address information manager 210 and the operation performing component 220 may determine whether a previous power cycle has normally ended. In one embodiment, a previous power cycle may be considered to have normally ended when the power loss protection operation has been normally performed in the previous power cycle. When a power loss PWR_LOSS did not occur in the previous power cycle, the previous power cycle may be determined to have normally ended.

When first to fourth write data WDATA 1, WDATA 2, WDATA 3, and WDATA 4 are all stored in the second backup block 102_2, it may be determined that the previous power cycle normally ended. In one embodiment, the previous power cycle may be determined to have normally ended when meta data, including information representing that the power loss protection operation has been performed, is stored in the second backup block 102_2.

When some of meta data of the first to fourth write data WDATA 1, WDATA 2, WDATA 3 and WDATA 4 is not stored, it may be determined that the previous power cycle has abnormally ended. In one embodiment, it may be determined that the previous power cycle has abnormally ended when the meta data, including the information representing that the power loss protection operation has been performed, is not stored in the second backup block 102_2.

The address information manager 210 may acquire address information LBAT stored in the first backup block 102_1 according to whether the previous power cycle has been normally ended. In an embodiment, the address information LBAT stored in the first backup block 102_1 may be information generated in response to a power loss that has occurred in a previous power cycle. The address information LBAT stored in the first backup block 102_1 may include logical addresses LBA 1, LBA 2, LBA 3 and LBA 4 temporarily stored in address buffer 320.

When it is determined that the previous power cycle has abnormally ended, the address information manager 210 may control the memory device 100 to read the address information LBAT stored in the first backup block 102_1. When the address information manager 210 acquires the address information LBAT from the memory device 100, the address information manager 210 may provide the address information LBAT to the operation performing component 220.

The operation performing component 220 may acquire first to third write data WDATA 1, WDATA 2 and WDATA 3 stored in the second backup block 102_2, for example, according to whether the previous power cycle has been normally ended. When it is determined that the previous power cycle has abnormally ended, the operation performing component 220 may control the memory device 100 to read the first to third write data WDATA 1, WDATA 2 and WDATA 3 stored in the second backup block 102_2.

When the operation performing component 220 acquires the first to third write data WDATA 1, WDATA 2 and WDATA 3 from the memory device 100, the operation performing component 220 may check the fourth write data WDATA 4 as loss write data of which recovery fails among the first to fourth write data WDATA 1, WDATA 2, WDATA 3, and WDATA 4 according to the address information LBAT provided from the address information manager 210. The operation performing component 220 may detect the fourth logical address LBA 4 of the fourth write data WDATA 4.

In an embodiment, the operation performing component 220 may detect a logical address of the fourth write data WDATA 4 as a logical address of the loss write data, based on the address information LBAT and meta data of the first to third write data WDATA 1, WDATA 2, and WDATA 3. The operation performing component 220 may provide the fourth logical address LBA 4 to the host 500.

In an embodiment, the logical address of the loss write data may be provided to the host 500, regardless of a request separately provided by the host 500. In one embodiment, the logical address of the loss write data may be provided to the host 500 according to a request separately provided by the host 500.

Additionally, the operation performing component 220 may provide the host 500 with a response notifying that the loss write data has occurred. When a plurality of storage devices 1000 operate using, for example, a redundant array of independent disks (RAID) scheme, loss write data may be recovered using write data and a logical address of the write data stored in the other storage devices except a storage device which detects a logical address of the loss write data, among the plurality of storage devices 1000. For example, the loss write data may be recovered by performing a logical operation (e.g., an exclusive OR (XOR) operation) on the write data stored in the other storage devices.

As described above, write data lost in the power loss protection operation and a logical address of the write data are detected so that the lost write data can be recovered. Accordingly, reliability of the storage device can be improved.

Figure 8:
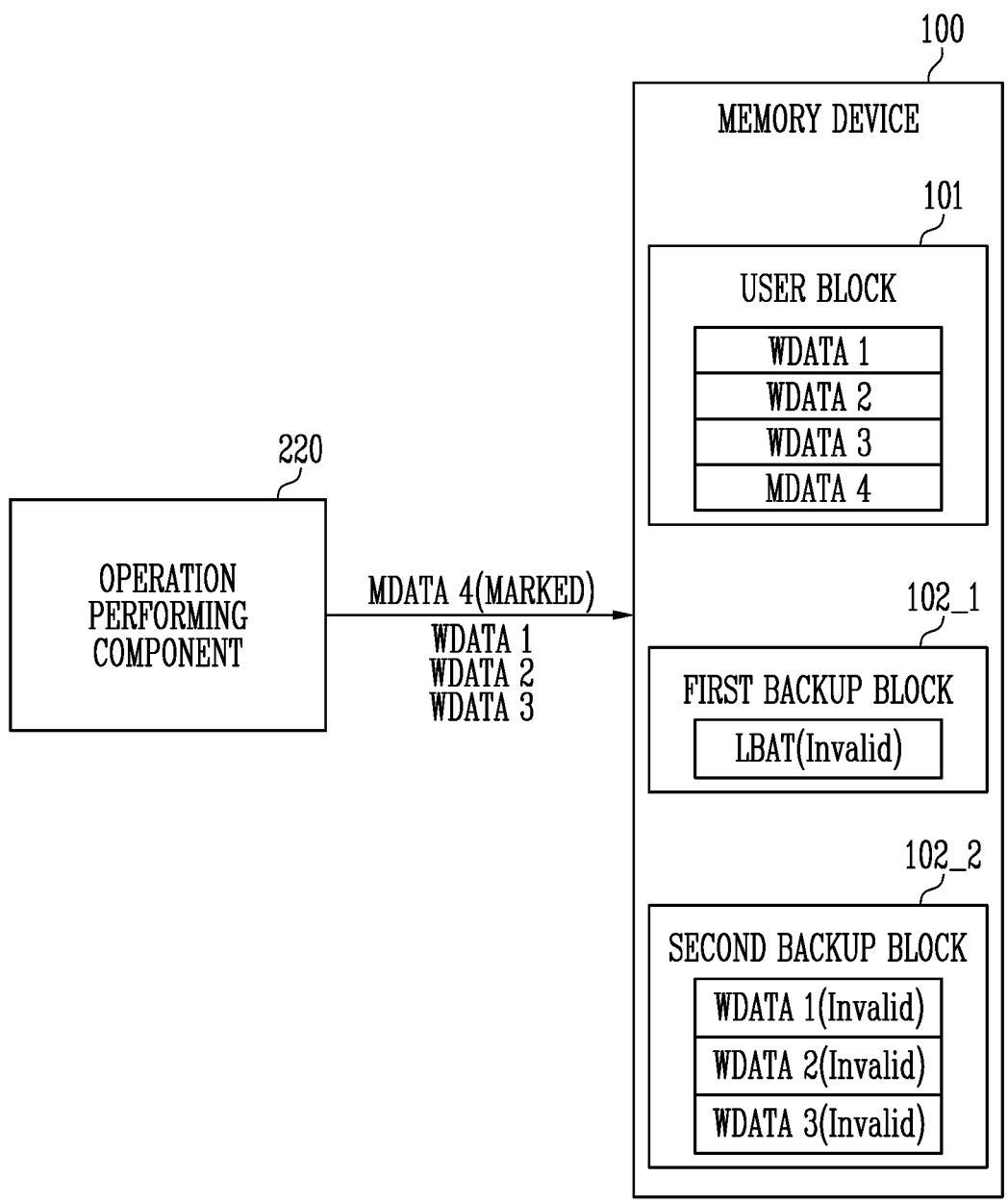
FIG. 8 illustrates an embodiment of storing recovered write data in a user block.

FIG. 8 is a diagram illustrating an embodiment of storing recovered write data in a user block. In this embodiment, it is assumed that a user block 101 is a selected user block having physical addresses mapped to logical addresses LAB 1, LAB 2, LAB 3 and LAB 4 provided from the host 500, that a backup block group includes a first backup block 102_1 and a second backup block 102_2, that first to third write data WDATA 1, WDATA 2 and WDATA 3 are recovered write data, that fourth write data WDATA 4 is loss write data, and that a fourth logical address LBA 4 is a logical address of the loss write data.

Referring to FIG. 8, when the fourth write data WDATA 4 as the loss write data is checked and the fourth logical address LBA 4 of the fourth write data WDATA 4 is detected, the operation performing component 220 may mark an error sign in meta data MDATA 4 of the fourth write data WDATA 4. The error sign may indicate, for example, that an uncorrectable error has occurred in write data.

In an embodiment, the operation performing component 220 may perform uncorrectable error correction code processing on the meta data MDATA 4 of the fourth write data WDATA 4. An example is described with reference to FIG. 2. The operation performing unit 220 may allow uncorrectable error data UECC to be included in the meta data MDATA 4 of the fourth write data WDATA 4.

The operation performing component 220 may control the memory device 100 to store, in the user block 101, recovered first to third write data WDATA 1, WDATA 2 and WDATA 3 and the meta data MDATA 4 of the fourth write data WDATA 4.

The operation performing component 220 may control the memory device 100 to process data stored in the first and second backup blocks 102_1 and 102_2 to be invalid. Address information LBAT stored in the first backup block 102_1 may be processed to be invalid. In addition, the first to third write data WDATA 1, WDATA 2 and WDATA 3 stored in the second backup block 102_2 may also be processed to be invalid.

Figure 9:
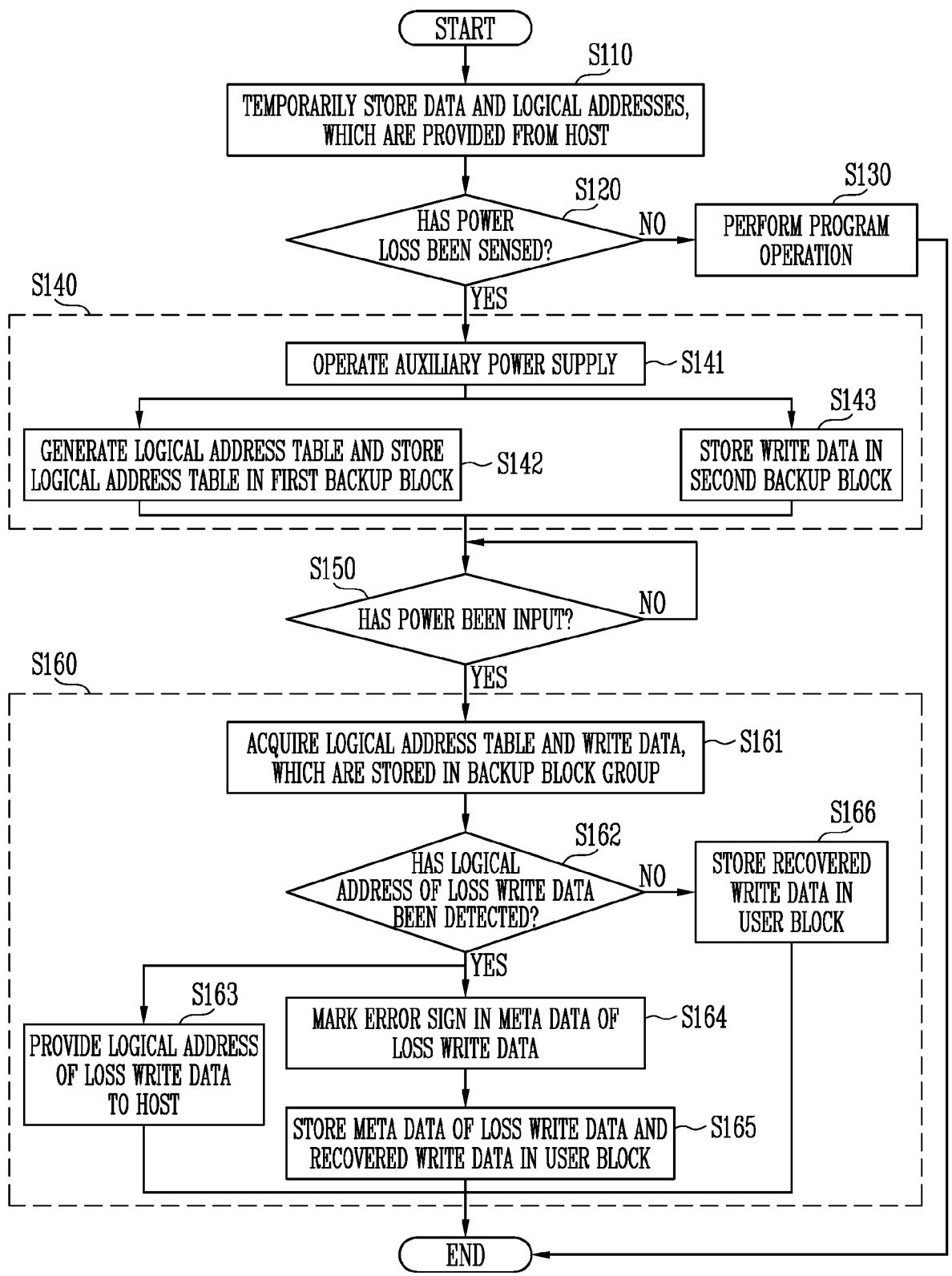
FIG. 9 illustrates an embodiment of a method of operating a storage device.

FIG. 9 is a flowchart illustrating an embodiment of a method of operating a storage device 1000, which, for example, may be storage device corresponding to any of the embodiments described herein.

Referring to FIG. 9, the method includes, at S110, the storage device 1000 temporarily storing data and logical addresses, which are provided from the host 500. An example is described with reference to FIGS. 1 and 5. The memory controller 200 may temporarily store the first to fourth data DATA 1, DATA 2, DATA 3 and DATA 4 in the write buffer 310. Also, the memory controller 200 may temporarily store the logical addresses LBA 1, LBA 2, LBA 3 and LBA 4 in the address buffer 320. At S120, the storage device 1000 may sense power loss. An example is described with reference to FIG. 6. The address information manager 210 may sense whether the power loss PWR_LOSS has occurred.

At S130, when the power loss is not sensed (S120, No), the storage device 1000 may perform a program operation. The program operation may be an operation of storing data provided from the host 500 in a selected user block among the plurality of user blocks 101 in the memory device 100. An example will be described below. The memory controller 200 may control the memory device 100 to store the first to fourth data DATA 1, DATA 2, DATA 3 and DATA 4 in a user block having physical addresses mapped to the logical addresses LBA 1, LBA 2, LBA 3 and LBA 4 among the plurality of user blocks 101.

At S140, when the power loss is sensed (S120, Yes), the storage device 1000 may perform a power loss protection operation. For example, at S141, the auxiliary power supply 400 may operate in response to the occurrence of the power loss. An example is described with reference to FIG. 1. The auxiliary power supply 400 may supply auxiliary power to the memory controller 200.

At S142, the memory controller 200 may control the memory device 100 to generate a logical address table including information representing the temporarily stored logical addresses and to store the logical address table in the first backup block 102_1 in the memory device 100. The logical address table may be the address information LBAT having the table structure, for example, as described with reference to FIG. 6. The address information manager 210 may generate address information LBAT including the logical addresses LBA 1, LBA 2, LBA 3 and LBA 4, and may control the memory device 100 to store the address information LBAT in the first backup block 102_1.

At S143, the memory controller 200 may control the memory device 100 to store write data in the second backup block 102_2. An example is described with reference to FIG. 6. The operation performing component 220 may control the memory device 100 to store, in the second backup block 102_2, first to fourth write data WDATA 1, WDATA 2, WDATA 3 and WDATA 4, including the first to fourth data DATA 1, DATA 2, DATA 3 and DATA 4 and meta data thereof, in response to the notification signal IRQ provided from the address information manager 210. In an embodiment, operations S142 and S143 may be performed in parallel.

At S150, the storage device 1000 may determine whether power is input after the power loss has occurred.

At S160, when power is input to the storage device 1000 (S150, Yes), the storage device 1000 may perform a recovery operation. For example, at S161, the memory controller 200 may acquire a logical address table and write data, which are stored in a backup block group including the first backup block 102_1 and the second backup block 102_2. An example is described with reference to FIG. 7. The address information manager 210 may control the memory device 100 to read the address information LBAT stored in the first backup block 102_1. The operation performing component 220 may control the memory device 100 to read the first to third write data WDATA 1, WDATA 2 and WDATA 3 stored in the second backup block 102_2.

At S162, the memory controller 200 may determine whether a logical address of write data of which recovery fails has been detected, based on the acquired write data and the acquired logical address table. The memory controller 200 may check the logical address of the write data from meta data of the write data, and may detect a logical address of loss write data, according to whether any logical address exists in addition to the logical address of the write data among logical addresses of the logical address table. An example is described with reference to FIG. 7. The operation performing component 220 may detect a logical address of the fourth write data WDATA 4 as a logical address of the loss write data, based on the address information LBAT provided from the address information manager 210 and meta data of the first to third write data WDATA 1, WDATA 2 and WDATA 3.

At S163, when the logical address of the loss write data is detected (S162, Yes), the memory controller 200 may provide the logical address of the loss write data to the host 500. An example is described with reference to FIG. 7. The operation performing component 220 may provide a fourth logical address LBA 4 to the host 500.

At S164, the memory controller 200 may mark an error sign in meta data of the loss write data.

At S165, the memory controller 200 may control the memory device 100 to store the meta data of the loss write data and recovered write data in the user block 101. An example is described with reference to FIG. 7. The operation performing component 220 may mark an error sign in meta data MDATA 4 of the fourth write data WDATA 4. The error sign may indicate that an uncorrectable error has occurred in the write data. The operation performing component 220 may control the memory device 100 to store, in the user block 101, recovered first to third write data WDATA 1, WDATA 2 and WDATA 3 and the meta data MDATA 4 of the fourth write data WDATA 4. In an embodiment, operations S163 and S164 may be performed in parallel.

At S166, when the logical address of the loss write data is not detected because the power loss protection operation is successfully performed (S162, No), the memory controller 200 may control the memory device 100 to store recovered write data in the user block 101.

Figure 10:
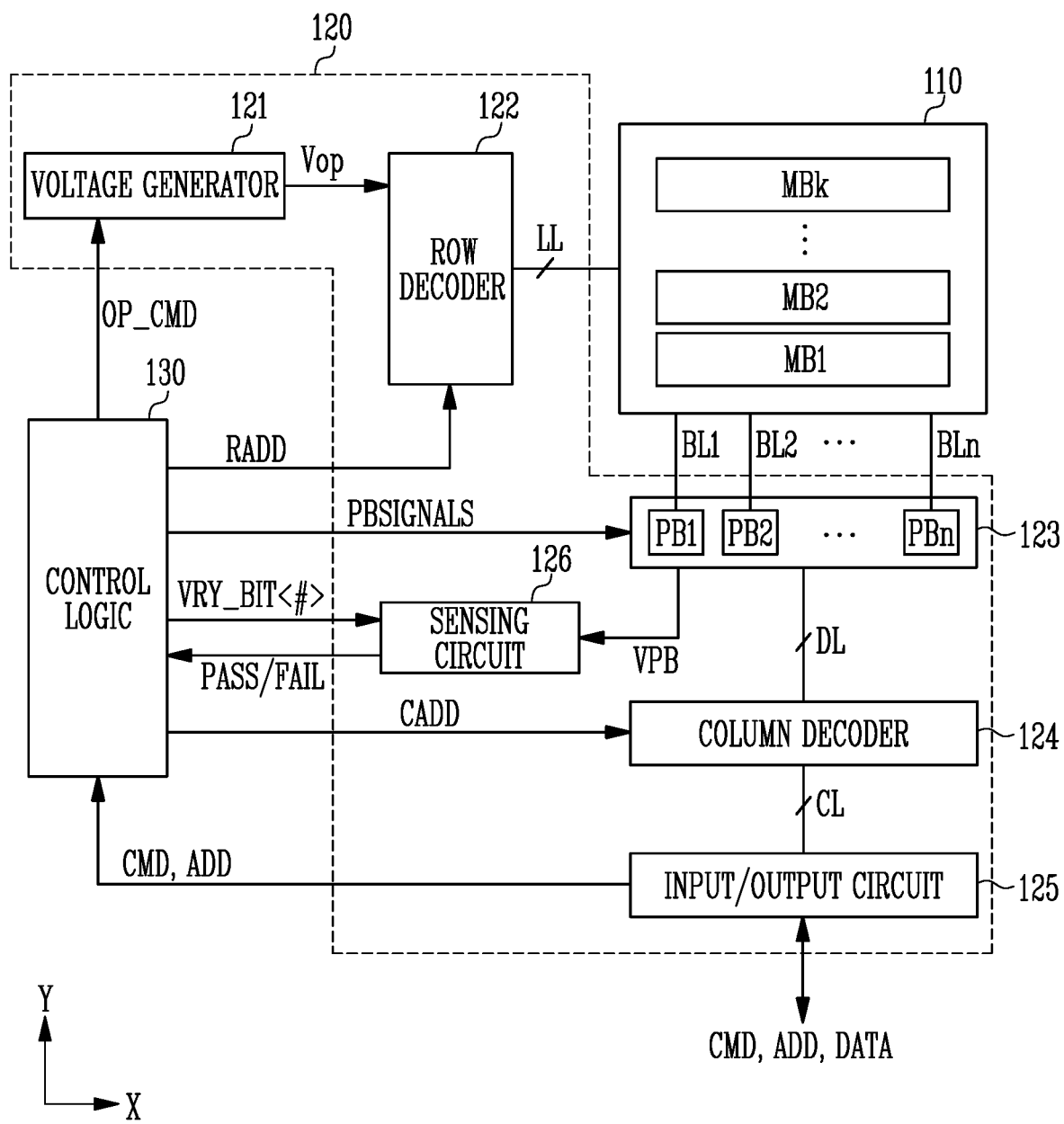
FIG. 10 illustrates an embodiment of a memory device.

FIG. 10 is a diagram illustrating an embodiment of a memory device 100, which may include a memory cell array 110, a peripheral circuit 120, and a control logic 130. The memory cell array 110 may include a plurality of memory blocks MB1 to MBk (k is a positive integer). The number of the plurality of memory blocks MB1 to MBk shown is an example, and may be a different number in another embodiment.

Each of the memory blocks MB1 to MBk may be connected to local lines LL and bit lines BL1 to BLn (n is a positive integer). The local lines LL may be connected to a row decoder 122 and also may be connected to each of the memory blocks MB1 to MBk. The local lines LL may include a first select line, a second select line, and a plurality of word lines arranged between the first select line and the second select line. In addition, the local lines LL may include one or more dummy lines arranged between the first select line and the word lines, one or more dummy lines arranged between the second select line and the word lines, and pipe lines. The bit lines BL1 to BLn may be commonly connected to the memory blocks MB1 to MBk.

The memory blocks MB1 to MBk may be implemented in a two-dimensional or three-dimensional structure. For example, memory cells in the memory blocks MB1 to MBk having the two-dimensional structure may be arranged in a direction parallel to a substrate. In one embodiment, memory cells in the memory blocks MB1 to MBk having the three-dimensional structure may be stacked in a direction vertical to a substrate.

The peripheral circuit 120 may include a voltage generator 121, the row decoder 122, a page buffer group 123, a column decoder 124, an input/output circuit 125, and a sensing circuit 126. The voltage generator 121 may generate various operating voltages Vop used for a program operation, a read operation, and an erase operation in response to an operation command OP_CMD. Also, the voltage generator 121 may selectively discharge the local lines LL in response to the operation command OP_CMD. For example, the voltage generator 121 may generate a program voltage, a verify voltage, pass voltages, a turn-on voltage, a read voltage, an erase voltage, a source line voltage, and the like under the control of the control logic 130.

In an embodiment, the voltage generator 121 may generate an internal power voltage by regulating external power voltage. The internal power voltage may be used, for example, as an operating voltage of memory device 100.

In an embodiment, the voltage generator 121 may generate a plurality of voltages using the external power voltage or the internal power voltage. For example, the voltage generator 121 may include a plurality of pumping capacitors for receiving the internal power voltage and may generate a plurality of voltages by selectively activating the plurality of pumping capacitors under the control of the control logic 130. The generated voltages may be supplied to the memory cell array 110 by the row decoder 122.

The row decoder 122 may transfer the operating voltages Vop to the local lines LL in response to a row address RADD. The operating voltages Vop may be transferred to a selected memory block, among the memory blocks MB1 to MBk, through the local lines LL. For example, in a program operation, the row decoder 122 may apply a program voltage to a selected word line and may apply a program pass voltage having a level different from (e.g., lower than) that of the program voltage to unselected word lines. In a program verify operation, the row decoder 122 may apply a verify voltage to the selected word line and may apply a verify pass voltage higher than the verify voltage to the unselected word lines.

In a read operation, the row decoder 122 may apply a read voltage to the selected word line and may apply a read pass voltage higher than the read voltage to the unselected word lines.

In an erase operation, the row decoder 122 may select one memory block according to a decoded address. In the erase operation, the row decoder 122 may apply a ground voltage to word lines connected to the selected memory block.

The page buffer group 123 may include first to nth page buffers PB1 to PBn. The first to nth page buffers PB1 to PBn may be connected to the memory cell array 110 respectively through first to nth bit lines BL1 to BLn. The first to nth page buffers PB1 to PBn may operate under the control of the control logic 130. For example, the first to nth page buffers PB1 to PBn may operate in response to page buffer control signals PBSIGNALS. In one embodiment, the first to nth page buffers PB1 to PBn may temporarily store data received through the first to nth bit lines BL1 to BLn, or may sense a voltage or current of the bit lines BL1 to BLn in a read operation or a verify operation.

In a program operation, when the program voltage is applied to the selected word line, the first to nth page buffers PB1 to PBn may transfer data DATA received through the column decoder 124 and the input/output circuit 125 to selected memory cells through the first to nth bit lines BL1 to BLn. Memory cells of a selected page are programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a verify operation, the first to nth page buffers PB1 to PBn may sense data stored in selected memory cells through the first to nth bit lines BL1 to BLn.

In a read operation, the first to nth page buffers PB1 to PBn may sense data DATA from memory cells of a selected page through the first to nth bit lines BL1 to BLn, and may output the sensed data DATA to the input/output circuit 125 under the control of the column decoder 124.

In an erase operation, the first to nth page buffers PB1 to PBn may float the first to nth bit lines BL1 to BLn.

The column decoder 124 may transfer data between the input/output circuit 125 and the page buffer group 123 in response to a column address CADD. For example, the column decoder 124 may exchange data with the page buffers PB1 to PBn through data lines DL, or may exchange data with input/output circuit 125 through column lines CL.

The input/output circuit 125 may transfer a command CMD and an address ADD, which are transferred from memory controller 200, to control logic 130 or may exchange data DATA to the column decoder 124.

In a read operation or a verify operation, the sensing circuit 126 may generate a reference current in response to an allow bit VRY_BIT<#>, and may output a pass signal PASS or a fail signal FAIL by comparing a sensing voltage VPB received from the page buffer group 123 with a reference voltage generated by the reference current.

The control logic 130 may control the peripheral circuit 120 by outputting the operation command OP_CMD, the row address RADD, the page buffer control signal PBSIGNALS, and the allow bit VRY_BIT<#> in response to the command CMD and the address ADD.

Figure 11:
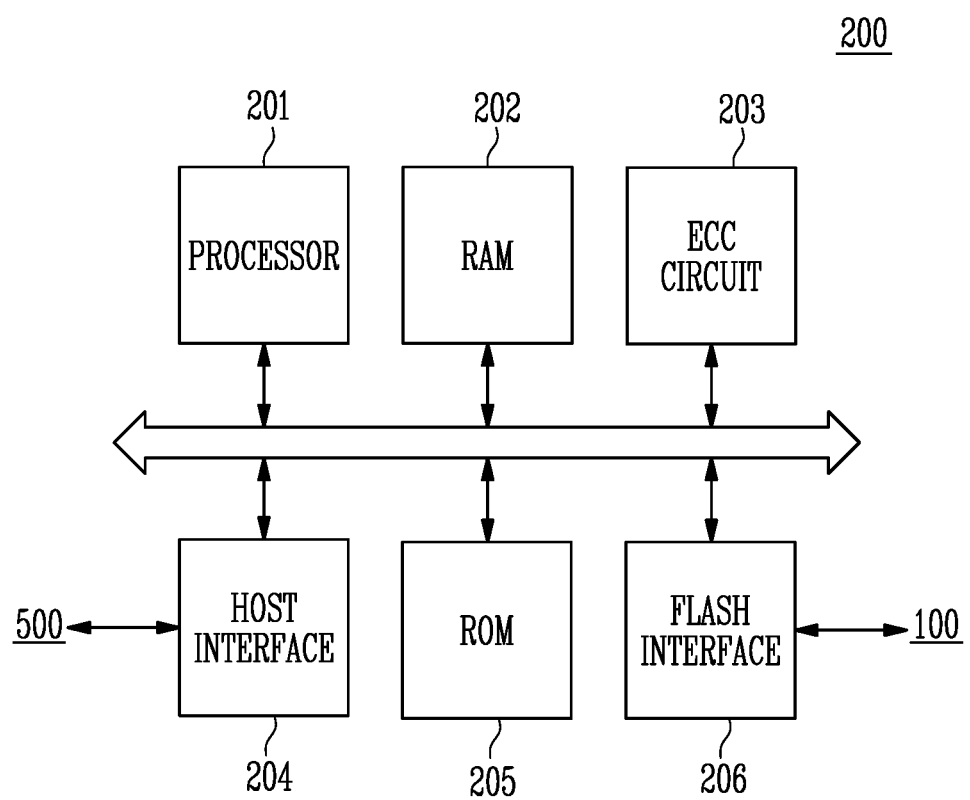
FIG. 11 illustrates an embodiment of a memory controller.

FIG. 11 is a diagram illustrating an embodiment of memory controller, which may include a processor 201, a RAM 202, an error correction code (ECC) circuit 203, a host interface 204, a ROM 205, and a flash interface 206. The processor 201 may control overall operations of the memory controller 200, and the RAM 202 may be used as a buffer memory, a cache memory, a working memory, etc. of the memory controller 200. For illustrative purposes, RAM 202 may be considered to be a buffer memory in this embodiment.

The ECC circuit 203 may generate an ECC for correcting a fail bit or error bit of data received from the memory device 100. The ECC circuit 203 may generate data to which one or more parity bits are added by performing ECC encoding of data provided to the memory device 100. The parity bit(s) may be stored in the memory device 100. The ECC circuit 203 may perform ECC decoding on data output from memory device 100.

The ECC circuit 203 may correct an error using a parity. For example, the ECC circuit 203 may correct an error using various coded modulations, such as an LDPC code, a BCH code, a turbo code, a Reed-Solomon code, a convolution code, an RSC, a TCM, and a BCM.

The ECC circuit 203 may calculate an ECC value of data to be programmed to the memory device 100 in a program operation. The ECC circuit 203 may perform an error correction operation on data read from the memory device 100 in a read operation, based on the ECC value. The ECC circuit 203 may perform an error correction operation of data recovered from the memory device 100 in a recovery operation of data which fails.

The memory controller 200 may communicate with an external device (e.g., the host 500, an application processor, or another device) through the host interface 204.

The ROM 205 may store instructions (e.g., including firmware), as well as various types of information for operation of the memory controller 200.

The memory controller 200 may communicate with the memory device 100, for example, through the flash interface 206. The memory controller 200 may transmit a command CMD, an address ADDR, a control signal CTRL, and/or other information, to the memory device 100 through the flash interface 206, and may receive data DATA. The flash interface 206 may include, for example, a NAND interface.

Figure 12:
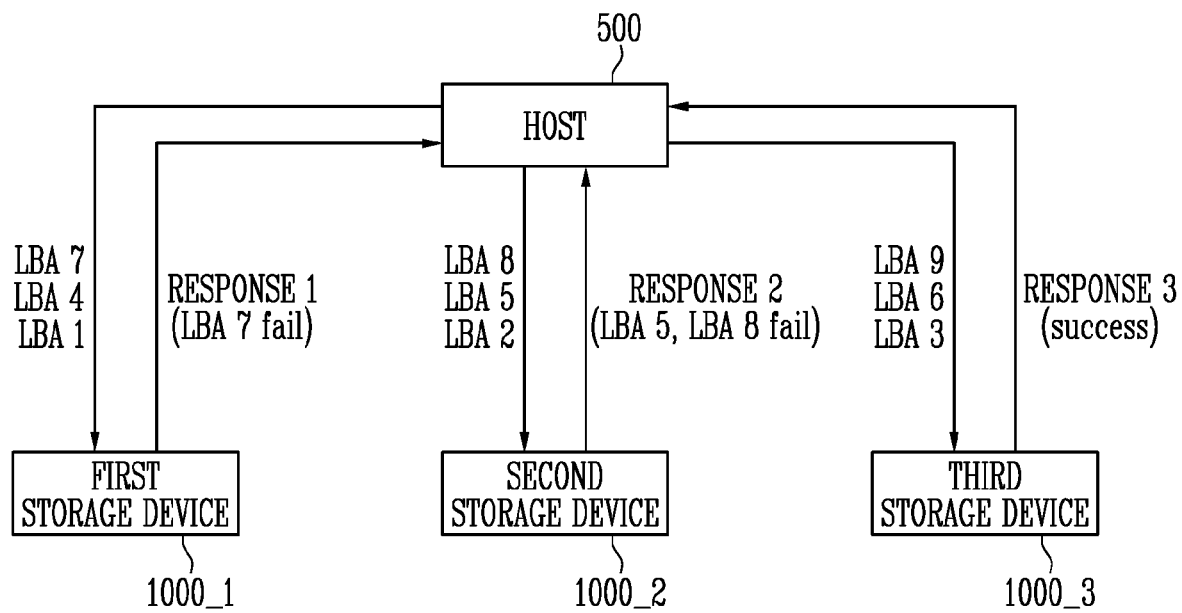
FIG. 12 illustrates an embodiment of a storage system which provides a response from storage devices for performing a recovery operation to a host.

FIG. 12 is a diagram illustrating an embodiment of a storage system which provides a response (from a plurality of storage devices for performing a recovery operation) to a host.

Referring to FIG. 12, the storage system may include, for example, host 500 and a plurality of storage devices 1000_1, 1000_2, and 1000_3. Each of the storage devices 1000_1, 1000_2 and 1000_3 may be implemented, for example, as the storage device 1000 described with reference to FIG. 1. Also, the embodiments described with reference to FIGS. 1 to 9 may be applied to each of the storage devices 1000_1, 1000_2 and 1000_3. Also, the number of storage devices 1000_1, 1000_2 and 1000_3 are shown to be three, but may be a different number in another embodiment.

The plurality of storage devices 1000_1, 1000_2 and 1000_3 may operate, for example, using a RAID scheme as described with reference to FIG. 1. The host 500 may provide a write request to each of the plurality of storage devices 1000_1, 1000_2 and 1000_3, and may provide a plurality of logical addresses LBA 1 to LBA 9 to the storage devices 1000_1, 1000_2 and 1000_3. In addition, the host 500 may write data to the storage devices 1000_1, 1000_2 and 1000_3. An example is described with reference to FIG. 12.

The host 500 may provide first, fourth and seventh logical addresses LBA 1, LBA 4 and LBA 7 to a first storage device 1000_1 among the plurality of storage devices 1000_1, 1000_2 and 1000_3. The host 500 may provide second, fifth and eighth logical addresses LBA 2, LBA 5 and LBA 8 to a second storage device 1000_2 among the plurality of storage devices 1000_1, 1000_2 and 1000_3. In this example, the host 500 may provide third, sixth, and ninth logical addresses LBA 3, LBA 6 and LBA 9 to a third storage device 1000_3 among the plurality of storage devices 1000_1, 1000_2 and 1000_3. However, the present disclosure is not limited thereto.

When a power loss does not occur, the plurality of storage devices 1000_1, 1000_2 and 1000_3 may store write data provided from the host 500. However, in some cases, a power loss may occur in some or all of the plurality of storage devices 1000_1, 1000_2 and 1000_3. For illustrative purposes, it is assumed that a power loss occurs in all of the storage devices 1000_1, 1000_2 and 1000_3. In this case, each of the storage devices 1000_1, 1000_2 and 1000_3 may perform a power loss protection operation. When power is input to the storage devices 1000_1, 1000_2 and 1000_3 after the power loss occurs, the storage devices 1000_1, 1000_2 and 1000_3 may perform a recovery operation. Also, the plurality of storage devices 1000_1, 1000_2 and 1000_3 may provide the host 500 with a response notifying a result of the recovery operation. A logical address of loss write data may be included in the response provided to the host 500.

For example, when the seventh logical address LBA 7 among the first, fourth and seventh logical addresses LBA 1, LBA 4 and LBA 7 is the logical address of the loss write data, the first storage device 1000_1 may provide the host 500 with the seventh logical address LBA 7 as a response.

For example, when each of the fifth and eighth logical addresses LBA 5 and LBA 8 among the second, fifth and eighth logical addresses LBA 2, LBA 5 and LBA 8 is the logical address of the loss write data, the second storage device 1000_2 may provide the host 500 with the fifth and eighth logical addresses LBA 5 and LBA 8 as a response.

For example, when the logical address of the loss write data does not exist among the third, sixth and ninth logical addresses LBA 3, LBA 6 and LBA 9, the third storage device 1000_3 may provide the host 500 with a response notifying that a plurality of operations succeed.

The host 500 may check the loss write data based on the logical addresses LBA 5, LBA 7 and LBA 8 of the loss write data, and may provide the storage devices 1000_1, 1000_2 and 1000_3 with write data corresponding to the loss write data.

Figure 13:
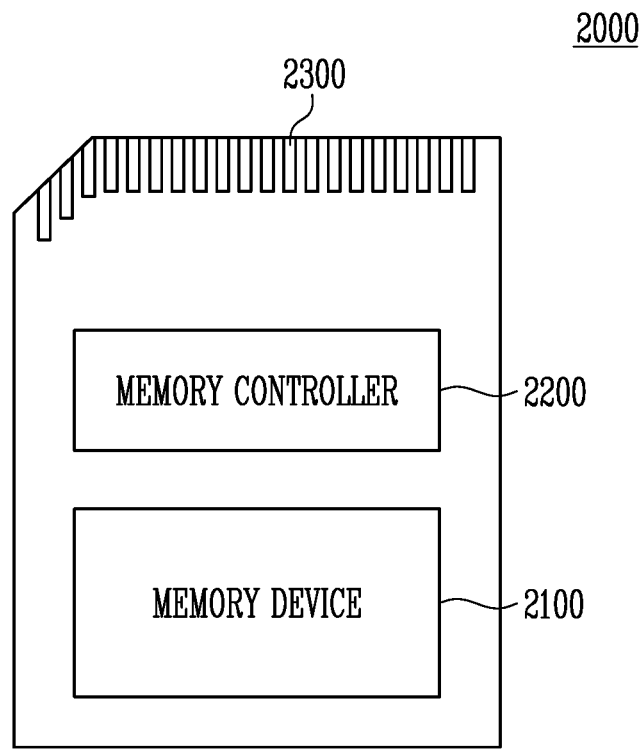
FIG. 13 illustrates an embodiment of a memory card system.

FIG. 13 is a block diagram illustrating an embodiment of a memory card system 2000, to which a storage device in accordance with any of the embodiments described herein may be applied. The memory device 2100 may be implemented as a nonvolatile memory device. Examples include an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM).

Referring to FIG. 13, the memory card system 2000 includes a memory device 2100, a memory controller 2200, and a connector 2300. The memory controller 2200 is connected to and may access the memory device 2100. For example, the memory controller 2200 may control read, write, erase, and background operations of the memory device 2100. The memory controller 2200 may also serve as an interface between the memory device 2100 and a Host. The memory controller 2200 executes instructions (e.g., drives firmware) for controlling the memory device 2100, and, for example, may be implemented as memory controller 200 described with reference to FIG. 1.

The memory controller 2200 may include components such as a Random Access Memory (RAM), a processing unit, a host interface, a memory interface, and an error corrector. Additionally, the memory controller 2200 may communicate with an external device through the connector 2300. For example, the memory controller 2200 may communicate with the external device (e.g., a host 500) according to a specific communication protocol or standard. Examples include a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. The connector 2300 may be compatible with at least one of the above-described various communication protocols.

The memory device 2100 and the memory controller 2200 may be integrated into a single semiconductor device to constitute a memory card. Examples of the memory card include a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 14:
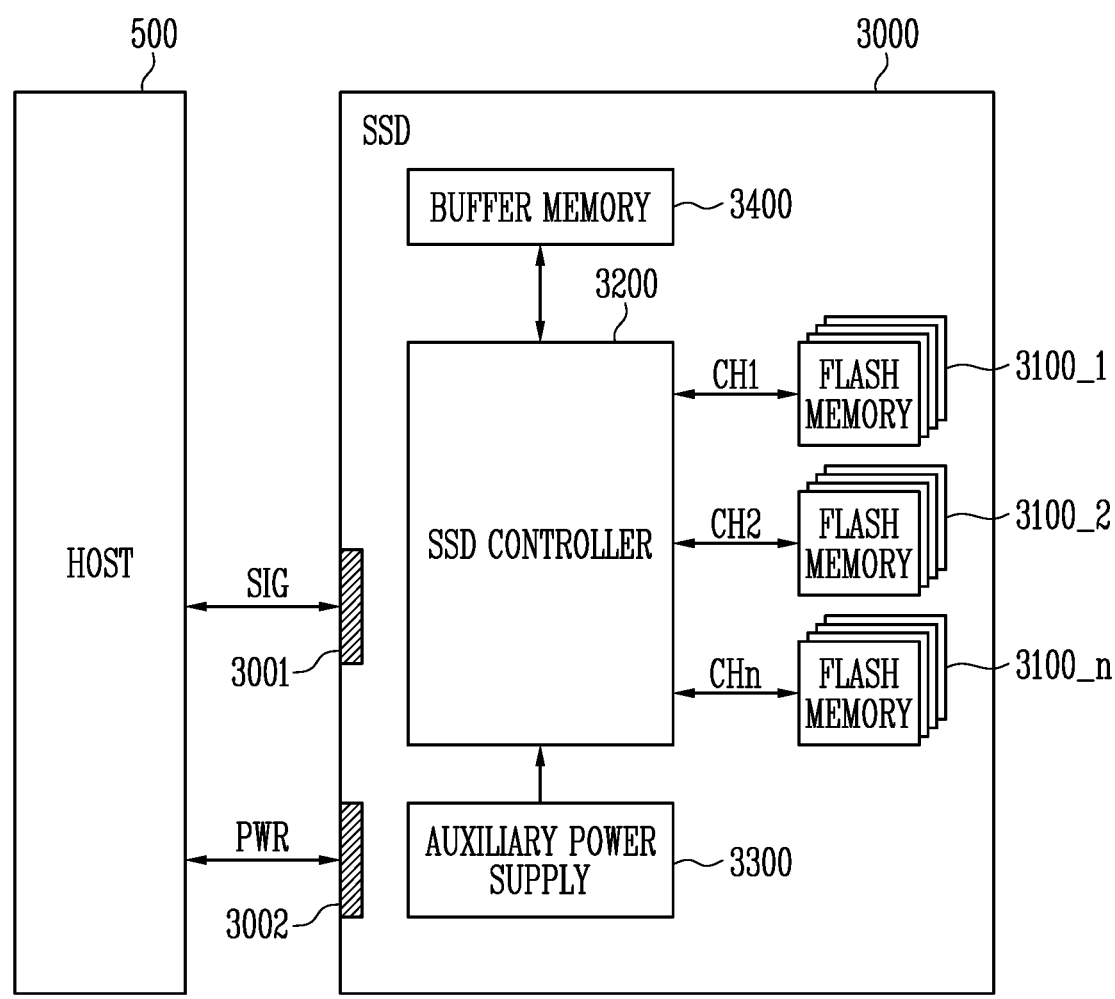
FIG. 14 illustrates an embodiment of a Solid State Drive system.

FIG. 14 is a block diagram illustrating an embodiment of a Solid State Drive (SSD) system, to which any of the embodiments of the storage device described herein may be applied.

Referring to FIG. 14, the SSD system includes a host 500 and an SSD 3000. The SSD 3000 exchanges a signal SIG with the host 500 through a signal connector 3001 and receives power PWR through a power connector 3002. The SSD 3200 includes an SSD controller 3200, a plurality of flash memories 3100_1, 3100_2, and 3100_n, an auxiliary power supply 3300, and a buffer memory 3400. In accordance with an embodiment, the SSD controller 3200 may perform the same functions as the memory controller 200 described with reference to FIG. 1.

The SSD controller 3200 may control the flash memories 3100_1, 3100_2 and 3100_n in response to a signal SIG received from the host 500. The signal SIG may be a signal based on an interface between the host 500 and the SSD 3000. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3300 is connected to the host 500 through the power connector 3002, and may receive power PWR from the host 500 and may use the power PWR to perform a charging operation. When the supply of power from the host 500 does not correspond to a predetermined level or pattern (e.g., is not smooth), the auxiliary power supply 3300 may provide power of the SSD 3000. The auxiliary power supply 3300 may be located in the SSD 3000 or may be external and coupled to the SSD 3000. For example, auxiliary power supply 3300 may be located on a main board to provide auxiliary power to the SSD 3000.

The buffer memory 3400 may temporarily store data. For example, the buffer memory 3400 may temporarily store data received from the host 500 and/or data received from the flash memories 3100_1, 3100_2 and 3100_n, and/or may temporarily store meta data (e.g., a mapping table) of the flash memories 3100_1, 3100_2 and 3100_n. The buffer memory 3400 may include one or more volatile memories (e.g., DRAM, SDRAM, DDR SDRAM, LPDDR SDRAM, GRAM, etc.) or one or more nonvolatile memories, e.g., FRAM, ReRAM, STT-MRAM, PRAM, etc.

Figure 15:
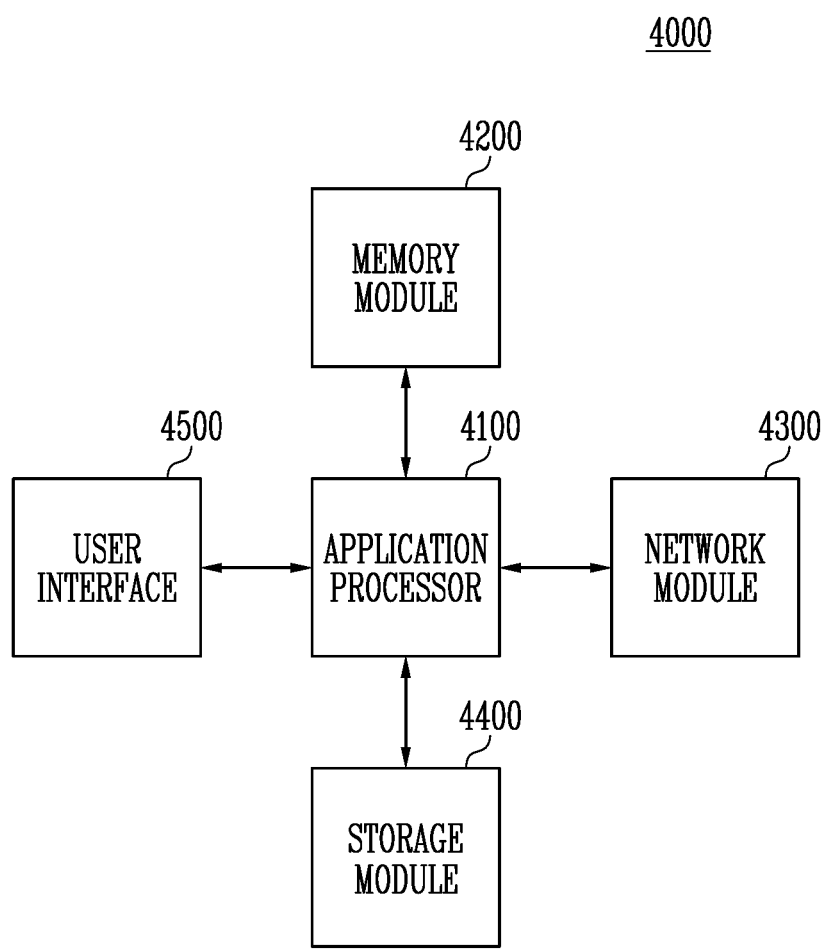
FIG. 15 illustrates an embodiment of a user system.

FIG. 15 is a block diagram illustrating an embodiment of a user system 400, to which any of the embodiments of the storage device described herein may be applied.

Referring to FIG. 15, user system 4000 may include an application processor 4100, a memory module 4200, a network module 4300, a storage module 4400, and a user interface 4500. The application processor 4100 may drive components in the user system 4000, an operating system (OS), a user program, and/or other features. For example, the application processor 4100 may include one or more controllers for controlling components in the user system 4000, interfaces, a graphic engine, and/or other features. The application processor 4100 may be provided, for example, as a System-on-Chip (SoC).

The memory module 4200 may operate as a main memory, working memory, buffer memory or cache memory of the user system 4000. Examples include volatile random access memories such as a DRAM, an SDRAM, a DDR SDRAM, a DDR2 SDRAM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In one embodiment, the application processor 4100 and the memory module 4200 may be provided as one semiconductor package, e.g., by being packaged based on a Package on Package (PoP).

The network module 4300 may communicate with external devices. For example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In one embodiment, the network module 4300 may be in the application processor 4100.

The storage module 4400 may store data. For example, the storage module 4400 may store data received from the application processor 4100. In one embodiment, the storage module 4400 may transmit data stored therein to the application processor 4100. The storage module 4400 may be implemented, for example, with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In one embodiment, the storage module 4400 may be a removable drive such as a memory card of the user system 4000 or an external drive.

The storage module 4400 may operate, for example, as storage device 1000 described with reference to FIG. 1. Also, the storage module 4400 may include a plurality of nonvolatile memory devices, which operate as the memory device 100 described with reference to FIG. 1.

The user interface 4500 may include one or more interfaces for inputting data or commands to the application processor 4100, and/or for outputting data to an external device. The user interface 4500 may include one or more user input interfaces (e.g., a keyboard, a keypad, a button, a touch panel, a touch screen, a touch pad, a touch ball, a camera, a microphone, a gyroscope sensor, a vibration sensor, a piezoelectric element, etc.) and/or one or more user output interfaces (e.g., a Liquid Crystal Display (LCD), an Organic Light Emitting Diode (OLED) display device, an Active Matrix OLED (AMOLED) display device, an LED, a speaker, a monitor, etc.).

In accordance with one or more of the aforementioned embodiments, a storage device may achieve high reliability by checking lost data in a power loss protection operation and may subsequently recover the lost data. An operating method of such a storage device is also provided.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, managers, components, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A storage device comprising:
   a memory device including a plurality of memory blocks;
   a buffer memory configured to temporarily store data; and
   a memory controller configured to, in response to occurrence of a power loss, generate address information including logical addresses of the data and write data including the data and meta data, and control the memory device to store the address information and the write data in a predetermined backup block group included in the plurality of memory blocks,
   wherein the memory controller, in response to supply of power after the occurrence of the power loss, detects a logical address of loss write data which is not stored in the backup block group when the power loss occurs based on a result of comparing the logical addresses included in the address information with logical addresses included in the write data read from the backup block group.

2. The storage device of claim 1, wherein the memory controller includes:
   an address information manager configured to output a notification signal indicating the occurrence of the power loss, generate the address information, and control the memory device to store the address information in the backup block group; and
   an operation controller configured to control the memory device to store the write data in the backup block group in response to the notification signal.

3. The storage device of claim 2, wherein the operation controller includes a flash translation layer configured to translate a logical address to a physical address.

4. The storage device of claim 3, wherein the operation controller further includes an interface layer configured to control an operation between a source of the data and the memory controller.

5. The storage device of claim 2, wherein
   the address information is stored in a first backup block of the backup block group, and
   the write data is stored in a second backup block of the backup block group.

6. The storage device of claim 1, wherein the address information is configured as a table including the logical addresses of the data.

7. The storage device of claim 1, further comprising an auxiliary power supply configured to supply auxiliary power to the memory controller in response to the occurrence of the power loss.

8. The storage device of claim 1, wherein
   the buffer memory is configured to temporarily store the logical addresses of the data, and
   the memory controller is configured to generate the address information based on the logical addresses of the data temporarily stored in the buffer memory.

9. A storage device comprising:
   a memory device including a plurality of memory blocks;
   a buffer memory configured to temporarily store data provided from the memory device; and
   a memory controller configured to, when power is supplied, acquire write data and address information, which are stored in a predetermined backup block group in a previous power cycle, detect a logical address of loss write data which is not stored in the backup block group based on a result of comparing logical addresses included in the address information with logical addresses included in the write data, and provide a host with the logical address of the loss write data, wherein the predetermined backup block group corresponds to one or more of the plurality of memory blocks included in the memory device.

10. The storage device of claim 9, wherein the memory controller is configured to determine that the previous power cycle has abnormally ended when a power loss occurred in the previous power cycle.

11. The storage device of claim 10, wherein, when the previous power cycle has abnormally ended, the memory controller is configured to control the memory device to read the write data and the address information, which are stored in the predetermined backup block group.

12. The storage device of claim 9, wherein
   the address information is generated in response to occurrence of a power loss in the previous power cycle, and
   the address information includes logical addresses of the data temporarily stored in the buffer memory.

13. The storage device of claim 9, wherein the memory controller is configured to check the loss write data based on the address information and meta data corresponding to the write data.

14. The storage device of claim 13, wherein the memory controller is configured to:
   mark, in the meta data corresponding to the loss write data, an error sign indicating that an uncorrectable error has occurred in the loss write data; and
   control the memory device to store recovered write data among the write data and the meta data corresponding to the loss write data, in at least one user block selected among the plurality of memory blocks.

15. The storage device of claim 9, wherein the memory controller includes:
   an address information manager configured to, when the previous power cycle has abnormally ended, control the memory device to read the address information stored in the backup block group, and output the address information provided from the memory device; and
   an operation controller configured to, when the previous power cycle has abnormally ended,
   control the memory device to read the write data stored in the backup block group,
   detect the logical address of the loss write data based on the address information provided from the address information manager and meta data corresponding to the write data provided from the memory device, and
   provide the logical address of the loss write data to the host.

16. The storage device of claim 15, wherein the operation controller is configured to control the memory device to store the meta data corresponding to the loss write data and recovered write data among the write data, in at least one selected user block among the plurality of memory blocks.

17. A method for operating a storage device, the method comprising:
   temporarily storing data and logical addresses corresponding to the data in a buffer memory;

generating, in response to occurrence of a power loss, a logical address table including information corresponding to the logical addresses temporarily stored in the buffer memory;

storing write data including the data and meta data and the logical address table in a backup block group included in a memory device; and detecting, in response to supply of power after the occurrence of the power loss, a logical address of loss write data which is not stored in the backup block group when the power loss occurs based on a result of comparing the logical addresses included in the logical address table with logical addresses included in the write data read from the backup block group.

18. The method of claim 17, further comprising:
providing a host with the logical address of the loss write data.

19. The method of claim 18, wherein the detecting of the logical address of the loss write data includes:
checking the logical addresses included in the write data from the meta data corresponding to the write data; and
detecting a logical address, except the logical addresses included in the write data among the logical addresses included in the logical address table, as the logical address of the loss write data.

20. The method of claim 18, further comprising:
marking, in meta data corresponding to the loss write data, an error sign indicating that an uncorrectable error has occurred in the loss write data; and
storing the meta data corresponding to the loss write data and recovered write data, in a user block included in the memory device.

* * * * *